United States Patent [19]

Jarrard

[11] Patent Number: 6,106,759
[45] Date of Patent: Aug. 22, 2000

[54] VARIABLE ORIENTATION MAGNET MOLDING TOOL

[75] Inventor: Craig A. Jarrard, Elkhart, Ind.

[73] Assignee: CTS Corporation, Elkhart, Ind.

[21] Appl. No.: 09/276,998

[22] Filed: Mar. 26, 1999

[51] Int. Cl.[7] .................................................. B29C 45/00
[52] U.S. Cl. ........................ 264/429; 425/3; 425/DIG. 33
[58] Field of Search .................................. 425/3, DIG. 33; 264/427, 478, 429

[56] References Cited

U.S. PATENT DOCUMENTS

| | | | |
|---|---|---|---|
| 4,444,550 | 4/1984 | Loubier ........................................ | 425/3 |
| 4,604,042 | 8/1986 | Tanigawa et al. ........................... | 425/3 |
| 5,453,224 | 9/1995 | Kuroda ..................................... | 264/427 |

FOREIGN PATENT DOCUMENTS 4250013  9/1992  Japan .
11144947  5/1999  Japan .

*Primary Examiner*—Harold Pyon
*Assistant Examiner*—Thukhanh T. Nguyen
*Attorney, Agent, or Firm*—Mark Bourgeois; Mark W. Borgman

[57] ABSTRACT

A magnet molding tool for controlling the orientation of magnetic particles in a polymer bonded magnet during injection molding. The tool has magnet mold having a mold cavity. A flux generator is connected to the magnet mold. The flux generator applies a magnetic field in the cavity. A non-magnetic cap is attached to the magnet mold and is dimensioned to modify the magnetic field in the cavity such that the orientation of the magnetic particles in the cavity varies proportionally to the dimensions of the non-magnetic cap. In an alternative embodiment, a slot is formed in the magnet mold and dimensioned to modify the magnetic field in the cavity.

13 Claims, 2 Drawing Sheets

VARIABLE ORIENTATION MAGNET MOLDING TOOL

BACKGROUND OF THE PREFERRED EMBODIMENT(S)

1. Field of the Preferred Embodiment(s)

This invention generally relates to a device to mold polymer bonded magnets. More specifically, the invention relates to a tool for variably controlling the orientation of the magnetic particles during molding of polymer bonded magnets.

2. Background of the Invention

Polymer bonded magnets are used in a variety of applications from refrigerator magnets to magnets for use in non-contacting position sensors. In non-contacting position sensors, the magnets need to have a magnetic field strength that varies along at least one dimension of the magnet. This can be done by varying one or more dimensions of the magnet. In other words, the magnet has a slope with a thick end and a thin end. Polymer magnets are molded by injecting a heated polymer containing magnetic particles into a mold. An electromagnet is placed adjacent the mold during molding to orient the magnetic particles in the desired direction of maximum field strength. Molding variable thickness magnets presents its own unique set of problems. It is difficult to mold magnets that have very thin sections. It is desirable to use a constant thickness magnet and impart a variable magnetic field strength to the magnet or to vary the magnetic field strength in sloping magnets without very thin sections.

This and other problems will be solved by the preferred embodiments of the invention.

DESCRIPTION OF RELATED ART

Examples of patents related to the present invention are as follows, wherein each patent is herein incorporated by reference for related and supporting teachings:

U.S. Pat. No. 4,444,550 is a Permanent Magnet Mold Apparatus.

The foregoing patents reflect the state of the art of which the applicant is aware and are tendered with the view toward discharging applicants acknowledged duty of candor in disclosing information that may be pertinent in the examination of this application. It is respectfully stipulated, however, that none of these patents teach or render obvious, singly or when considered in combination, applicants claimed invention.

SUMMARY OF THE PREFERRED EMBODIMENT(S)

It is a feature of the invention to provide a magnet molding tool for controlling the magnitude of orientation of magnetic particles in a polymer bonded magnet during injection molding. The tool includes a magnet mold having a mold cavity therein. A pair of electromagnets is connected to the magnet mold. The electromagnets apply a magnetic field in the cavity. A non-magnetic cap is attached to the magnet mold and is dimensioned to modify the magnetic field in the cavity such that the orientation of the magnetic particles in the cavity varies proportionally to the dimensions of the non-magnetic cap.

Another feature of the invention is to provide a magnet molding tool for controlling the orientation direction or magnitude of magnetic particles in a polymer bonded magnet during injection molding. The tool includes a magnet mold having a mold cavity therein. A first and second electromagnet is connected to the magnet mold and is operable to apply a magnetic field in the cavity. A slot is formed in the magnet mold and dimensioned to modify the magnetic field in the cavity such that the orientation of the magnetic particles in the cavity varies proportionally to the dimensions of the slot.

The invention resides not in any one of these features per se, but rather in the particular combination of all of them herein disclosed and claimed. Those skilled in the art will appreciate that the conception, upon which this disclosure is based, may readily be utilized as a basis for the designing of other structures, methods and systems for carrying out the several purposes of the present invention. Further, the abstract is neither intended to define the invention of the application, which is measured by the claims, neither is it intended to be limiting as to the scope of the invention in any way.

BRIEF DESCRIPTION OF THE DRAWINGS

These and other features of the invention can best be understood by the following description of the accompanying drawings as follows.

It is noted that the drawings of the invention are not to scale. Like element numbers represent like features between the figures. The drawings are merely schematic representations, not intended to portray specific parameters of the invention. The drawings are intended to depict only typical embodiments of the invention, and therefore should not be considered as limiting the scope of the invention. The invention will be described with additional specificity and detail through the accompanying drawings.

DETAILED DESCRIPTION OF THE PREFERRED EMBODIMENTS

Figure 1:
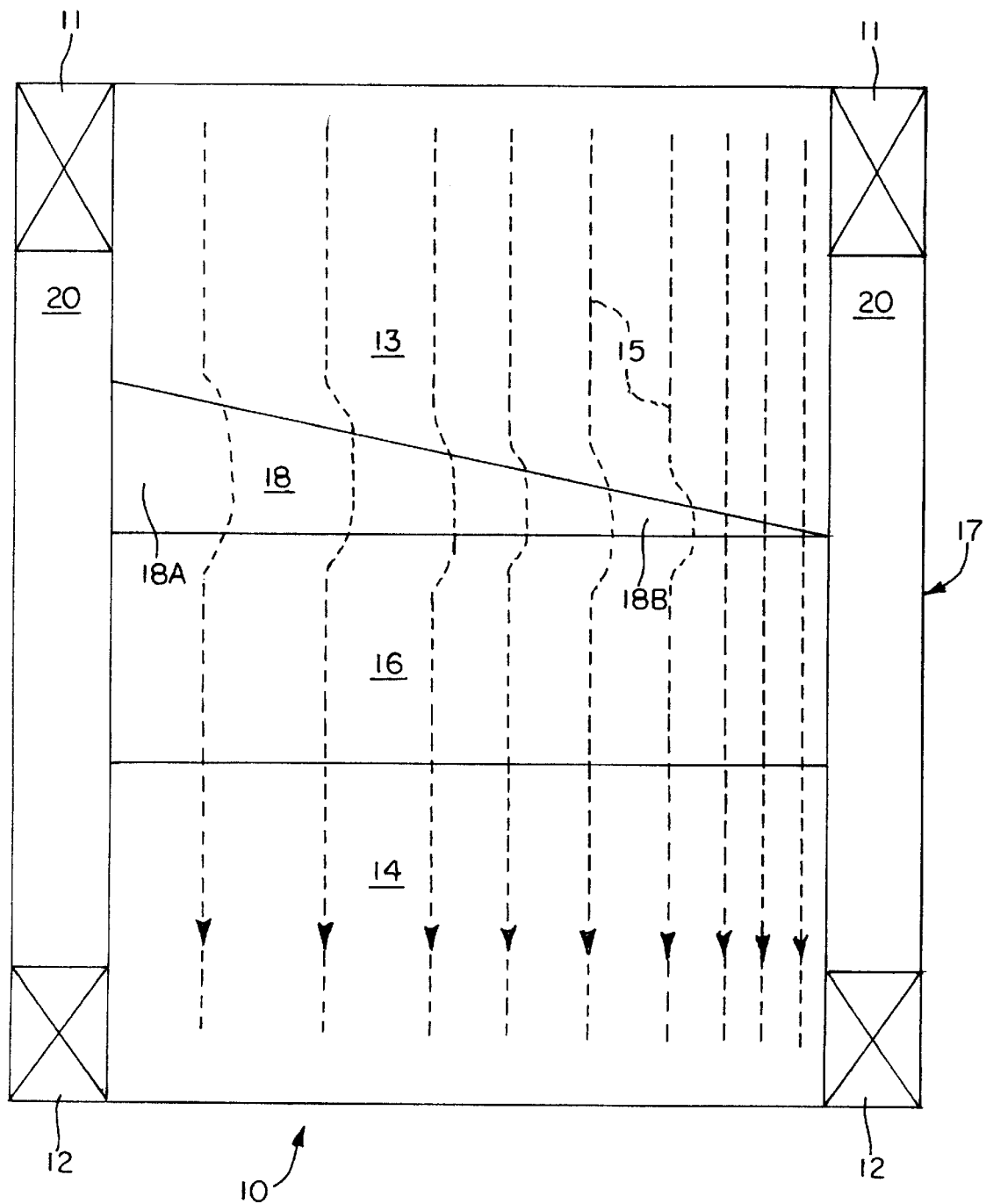
FIG. 1 is a cross-sectional view of the preferred embodiment of a magnet molding tool.

Referring to FIG. 1, there is a cross-sectional view of the preferred embodiment of a magnet molding tool 10. A pair of flux generators 11 and 12, such as conventional wire wound electromagnets are placed on each side of an upper magnetic steel plate 13 and a lower magnetic steel plate 14. A pair of non-magnetic side plates 20 are formed of a non-magnetic metal. Attached to upper magnetic steel plate 13 is a triangular shaped non-magnetic cap 18. Cap 18 can be formed from a suitable non-magnetic metal such as aluminum. Cap 18 has a thick end 18A and a thin end 18B. Cap 18 may be attached to plate 13 using conventional fasteners or by welding. Cap 18, and plates 14 and 20, define a magnet mold 17. Mold 17 has a mold cavity 16. An injection port (not shown) would be provided in one of plates 20 to allow the injection of liquid plastic during molding.

Figure 2:
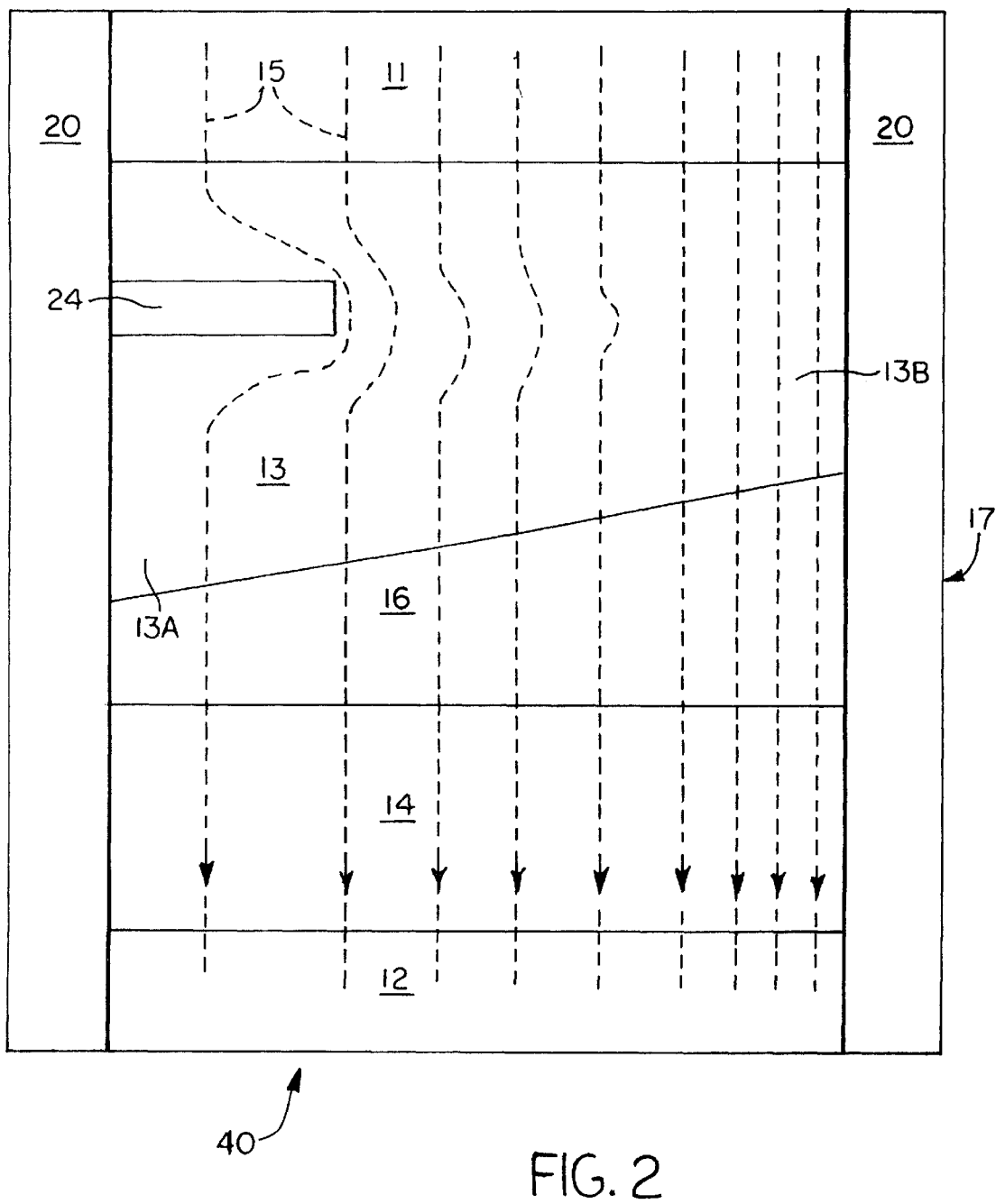
FIG. 2 is a cross-sectional view of an alternative embodiment of a magnet molding tool.

Referring to FIG. 2, there is a cross-sectional view of an alternative embodiment of a magnet molding tool 40. A pair of flux generators 11 and 12, such as a pair of permanent magnets, are placed on outer sides of upper magnetic steel plate 13 and lower magnetic steel plate 14. A pair of non-magnetic side plates 20 are formed of a non-magnetic metal. Upper magnetic steel plate 13 has a thick end 13A and a thin end 13B. Upper magnetic steel plate 13 has a rectangular slot 24 extending into thick end 13A. Plates 13, 14 and 20 define a magnet mold 17. mold 17 has a mold cavity 16. An injection port (not shown) would be provided in one of plates 20 to allow the injection of liquid plastic during molding.

Operation of the Preferred Embodiment

The operational use of the magnet molding tool of FIG. 1 is described next. Magnet molding tool 10 is placed in a conventional plastic injection mold. A liquid heated mixture of magnetic particles and a polymer or plastic is injected into mold 16 by a port (not shown). The magnetic particles and polymers are commercially available from Ems Corporation of Switzerland or from DIC Corporation of Japan. A current is applied to electromagnets 11 and 12 causing a flux 15 to flow from the upper steel plate 13, through cavity 16 and through plate 14. The current applied to electromagnets 11 and 12 are in the same direction so that flux 15 generated by the magnet flows in the same direction.

The non-magnetic cap 18 is dimensioned with a thick end 18A and a thin end 1 8B. Cap 18 causes flux 15 or magnetic field strength to vary across cavity 16. At thin end 1 8B, the flux lines 15 are spaced closer together indicating a stronger field and flow in a straighter line across cavity 16. At thick end 18A, flux lines 15 are spaced farther apart indicating a weaker field and flow in more of a curve across cavity 16. Flux field 15, applied to the magnetic particles suspended in the liquid plastic, causes the particles to rotate or orient so as to align themselves with the field. The variable magnetic field flowing across mold cavity 16 causes the orientation of the magnetic particles in the cavity to vary proportional to the dimensions of the non-magnetic cap. After the mold is cooled and the plastic solidifies, the magnetic particles are locked in place. The molded magnet is removed from tool 10. The magnetic particles in the magnet now have a varying orientation along the length of the magnet.

The operational use of the magnet molding tool of FIG. 2 is similar to that of FIG. 1. Magnet molding tool 40 is placed in a conventional plastic injection mold. A liquid heated mixture of magnetic particles and a polymer or plastic is injected into mold 16 by a port (not shown). Permanent magnets 11 and 12 cause a flux 15 to flow from the upper steel plate 13, through cavity 16 and through plate 14. Flux 15, generated by the magnets, flows in the same direction.

Slot 24 is dimensioned to extend partially into plate 13. Slot 24 causes the flux 15 or magnetic field strength to vary across cavity 16. At thin end 13B, the flux lines 15 are spaced closer together, indicating a stronger flux field and flow in a straighter line across cavity 16. At thick end 13A, the flux lines 15 are spaced farther apart indicating a weaker field and flow in more of a curve across cavity 16. The field applied to the magnetic particles suspended in the liquid plastic, causes the particles to rotate or orient so as to align themselves with the field. The variable magnetic field flowing across mold cavity 16 causes the orientation or direction of the magnetic particles in the cavity to vary proportional to the dimensions of slot 24. After the mold is cooled and the plastic solidifies, the magnetic particles are locked in place. The molded magnet is removed from tool 40. The magnetic particles in the magnet now have a varying orientation along the length of the magnet.

Variations of the Preferred Embodiment(s)

One of ordinary skill in the art of making magnet molds will realize that there are many different ways of accomplishing the preferred embodiment. For example, it was shown that cap 18 has a triangular shape, it is contemplated to make non-magnetic cap 18 shaped to have a series of steps, increasing in thickness. Cap 18 could also have a non-linear shape such as a parabola, for example.

It was shown that non-magnetic cap 18 was used with a mold cavity having a constant thickness. Cap 18 could be used with a mold cavity that has a slope or varying thickness. Similarly, It was shown that slot 24 was used with a mold cavity having a variable thickness. Cap 18 could be used with a mold cavity that has a constant thickness.

It was shown that slot 24 was located in plate 13, slot 24 could be located in plate 14. It was shown that slot 24 was rectangular shaped. It is possible that slot 24 can be other shapes such as triangular, or circular, or square.

While the invention has been taught with specific reference to these embodiments, someone skilled in the art will recognize that changes can be made in form and detail without departing from the spirit and the scope of the invention. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

What is claimed and desired to be secured by Letters Patent is:

1. A magnet molding tool for controlling orientation of magnetic particles in a polymer bonded magnet during injection molding, comprising:
   a. a magnet mold having a mold cavity therein;
   b. flux generating means, connected to the magnet mold, for applying a magnetic field in the cavity;
   c. a triangular non-magnetic cap attached to the magnet mold and dimensioned to modify the magnetic field in the mold cavity wherein the orientation of the magnetic particles in the cavity varies proportionally to the dimensions of the non-magnetic cap; and
   d. wherein the magnet mold has a first and second opposed mold plate and a third and fourth opposed mold plate.

2. The magnet molding tool according to claim 1, wherein the flux generating means are electromagnets connected to the first and second opposed mold plates.

3. The magnet molding tool according to claim 1, wherein the flux generating means are permanent magnets connected to the first and second opposed mold plates.

4. The magnet molding tool according to claim 1, wherein the non-magnetic cap is connected to the first mold plate.

5. A magnetic molding tool for controlling orientation of magnetic particles in a polymer bonded magnet during injection molding, comprising:
   e. a magnet mold having a mold cavity therein;
   f. flux generating means, connected to the magnet mold, for applying a magnetic field in the cavity;
   g. a slot attached to the magnet mold and dimensioned to modify the magnetic field in the mold cavity wherein the orientation of the magnetic particles in the cavity varies proportionally to the dimensions of the slot; and;
   h. wherein the magnet mold has a first and second opposed mold plate and a third and fourth opposed mold plate.

6. The magnet molding tool according to claim 5, wherein the flux generating means are electromagnets connected to the first and second opposed mold plates.

7. The magnet molding tool according to claim 5, wherein the flux generating means are permanent magnets connected to the first and second opposed mold plates.

8. The magnet molding tool according to claim 5, wherein the slot is in the first mold plate.

9. A method of injection molding a polymer bonded magnet having a variable orientation of magnetic particles in the magnet, comprising the steps of:
   a) providing a magnet mold having a mold cavity and a non-magnetic cap attached to the magnet mold, the cap dimensioned to modify an applied magnetic field in the cavity;
   b) injecting a heated mixture of magnetic particles and polymer particles into the magnet mold cavity; and
   c) applying the magnetic field to the magnet mold cavity such that the orientation of the magnetic particles in the magnet are varied proportional to the dimensions of the non-magnetic cap.

10. A method of injection molding a polymer bonded magnet having a variable orientation of magnetic particles in the magnet, comprising the steps of:
   a) providing a magnet mold having a slot formed therein, the slot dimensioned to modify an applied magnetic field in the cavity;
   b) injecting a heated mixture of magnetic particles and polymer particles into the magnet mold cavity; and
   c) applying the magnetic field to the magnet mold cavity such that the orientation of the magnetic particles in the magnet are varied proportional to the dimensions of the slot.

11. A magnet molding tool for creating a variable magnetic flux density along a length of a polymer bonded magnet during an injection molding process, comprising:
   a) a mold cavity having a first and second end;
   b) flux generating means, adjacent to the mold cavity, for generating a magnetic flux field that extends through the mold cavity; and
   c) flux varying means, adjacent to the mold cavity, for varying the magnetic flux density extending through the mold cavity to be weaker at the first end and stronger at the second end.

12. The magnet molding tool according to claim 11, wherein the flux varying means is a non-magnetic cap having a thick end adjacent to the first end of the cavity and a thin end proximate the second end.

13. The magnet molding tool according to claim 11, wherein the flux varying means is a magnetically permeable plate adjacent to the mold cavity having a slot therein.

* * * * *